United States Patent
Eggers, Jr. et al.

(10) Patent No.: US 7,904,525 B2
(45) Date of Patent: Mar. 8, 2011

(54) DISPLAYING OR HIDING FOLDERS IN AN E-MAIL CLIENT BASED ON USER DEFINED TIMINGS

(75) Inventors: Robert J. Eggers, Jr., Austin, TX (US); Janice M. Girouard, Austin, TX (US); Avinesh Kumar, Allahabad (IN); Sandeep Ramesh Patil, Maharashtra (IN); Darshak P. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 12/404,322

(22) Filed: Mar. 15, 2009

(65) Prior Publication Data

US 2010/0235449 A1   Sep. 16, 2010

(51) Int. Cl.
*G06F 15/16* (2006.01)
*G06F 3/00* (2006.01)

(52) U.S. Cl. ............. 709/206; 715/744; 715/747

(58) Field of Classification Search .............. None
See application file for complete search history.

(56) References Cited

U.S. PATENT DOCUMENTS

| 7,437,358 | B2 * | 10/2008 | Arrouye et al. | 1/1 |
| 7,596,594 | B2 * | 9/2009 | Karp | 709/203 |
| 2002/0087649 | A1 | 7/2002 | Horvitz | 709/207 |
| 2002/0099777 | A1 | 7/2002 | Gupta | 709/206 |
| 2007/0004385 | A1 | 1/2007 | Horvitz | 455/414.1 |
| 2008/0065736 | A1 | 3/2008 | Gross | 709/207 |

FOREIGN PATENT DOCUMENTS

CN   1961313 A  *  5/2007

* cited by examiner

*Primary Examiner* — Yemane Mesfin
(74) *Attorney, Agent, or Firm* — Ido Tuchman; Steven Bennett

(57) ABSTRACT

Techniques for managing electronic mail. Folder rules for associating electronic mail messages with folders are received. The folders are managed by an electronic mail client and stored in a computer usable memory. Electronic mail messages are also received. Each of the electronic mail messages is associated with at least one of the folders according to the folder rules. Furthermore, a visibility condition is received. The visibility condition specifies when a specified folder is visible in a user interface of the electronic mail client. A processor causes the specified folder not to be visible in the user interface when the visibility condition is not satisfied. A visibility condition may instead specify when a specified folder is not visible in the user interface. In this case, the specified folder is caused not to be visible in the user interface when the visibility condition is satisfied.

20 Claims, 4 Drawing Sheets

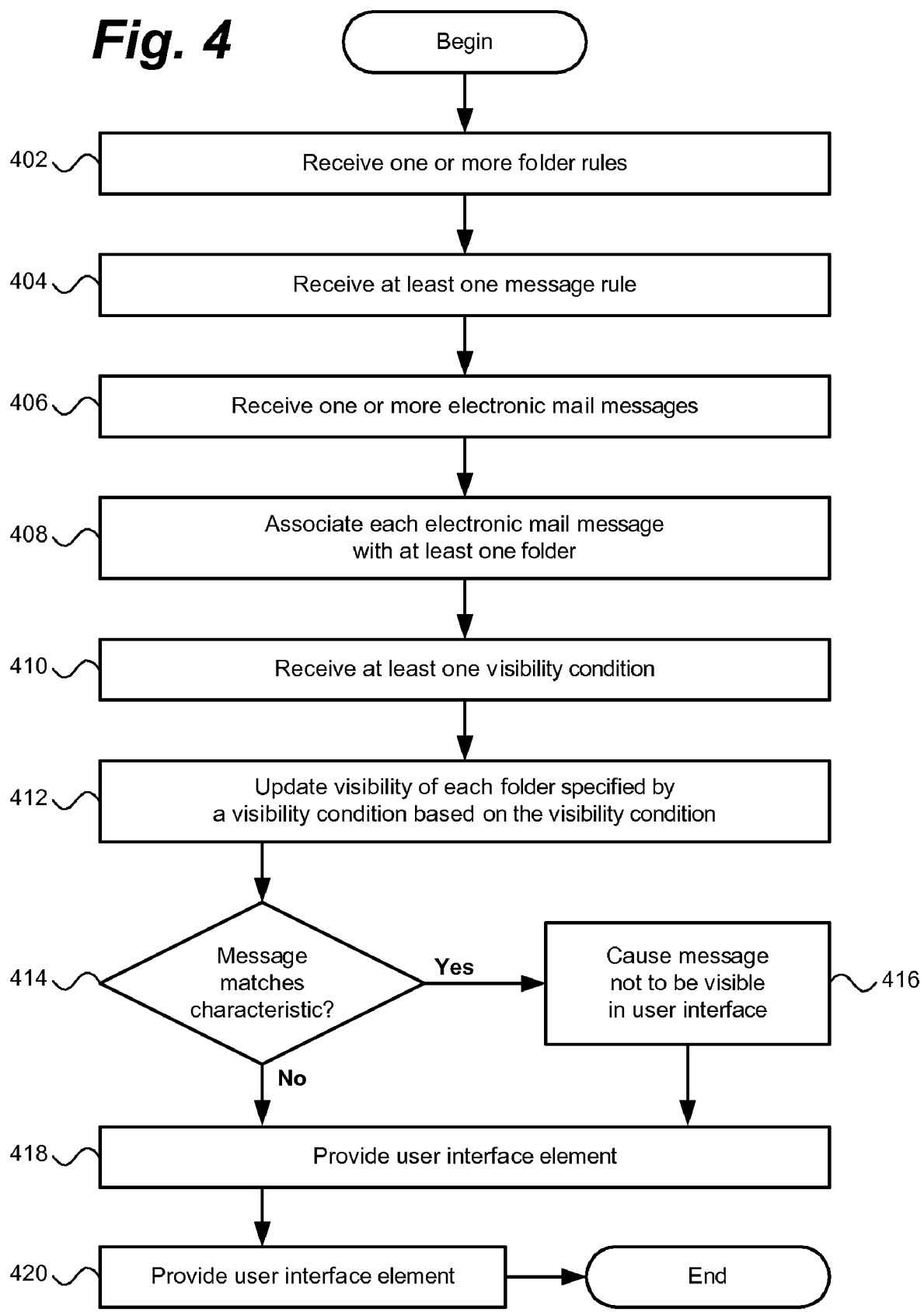

DISPLAYING OR HIDING FOLDERS IN AN E-MAIL CLIENT BASED ON USER DEFINED TIMINGS

BACKGROUND OF THE INVENTION

1. Field of the Invention

The present invention relates generally to electronic mail. More specifically, the present invention relates to techniques for displaying electronic mail messages selectively based on time periods specified by a user.

2. Description of Background

Electronic mail, commonly abbreviated "e-mail", is a form of computer-based communication. To communicate via electronic mail, a sender sends an electronic mail message to one or more recipients. Senders and recipients are each identified using electronic mail addresses. Most electronic mail messages include textual data. In many electronic mail messages, the textual data is marked up using Hypertext Markup Language (HTML). Additionally, an electronic mail message may include attachments. An attachment is a file transmitted with an electronic mail message. Attachments may contain any of a variety of types of data.

Electronic mail may be transmitted via the Internet. On the Internet, an electronic mail address is generally expressed in the form "<user>@<domain>". In this form, "<domain>" is the Internet domain name of a specific host on the Internet. The host may handle all electronic mail for an organization or a significant subset thereof. "<user>", in turn, identifies a specific user at this host. Thus, an electronic mail address expressed in this form uniquely identifies an Internet user. Electronic mail may also be transmitted via networks other than the Internet, including internal or proprietary networks. It is noted that on networks other than the Internet, electronic mail addresses may be expressed in forms other than the foregoing.

SUMMARY OF THE INVENTION

One aspect of the invention is a method for managing electronic mail. The method comprises receiving one or more folder rules for associating electronic mail messages with one or more folders. The folders are managed by an electronic mail client and stored in a computer usable memory. The method further comprises receiving one or more electronic mail messages. The method further comprises associating each of the electronic mail messages with at least one of the folders managed by the electronic mail client according to the folder rules. The method further comprises receiving a visibility condition specifying when a specified folder is visible in a user interface of the electronic mail client. The specified folder is one of the folders managed by the electronic mail client. The method further comprises causing, by a processor, the specified folder not to be visible in the user interface when the visibility condition is not satisfied.

Another aspect of the invention is a system for managing electronic mail. The system comprises a processor. The system further comprises a monitoring unit. The monitoring unit is configured to receive one or more folder rules for associating electronic mail messages with one or more folders. The folders are managed by an electronic mail client. The monitoring unit is further configured to receive one or more electronic mail messages. The monitoring unit is further configured to associate each of the electronic mail messages with at least one of the folders managed by the electronic mail client according to the folder rules. The system further comprises a display unit. The display unit is configured to receive a visibility condition specifying when a specified folder is visible in a user interface of the electronic mail client. The specified folder is one of the folders managed by the electronic mail client. The display unit is further configured to cause the specified folder not to be visible in the user interface when the visibility condition is not satisfied.

Another aspect of the invention is a computer program product embodied in a computer usable memory. For example, the computer program product may include one or more tools for managing electronic mail. Computer readable program codes are coupled to the computer usable memory and are configured to cause the program to receive one or more folder rules for associating electronic mail messages with one or more folders. The folders are managed by an electronic mail client. The computer readable program codes are further configured to cause the program to receive one or more electronic mail messages. The computer readable program codes are further configured to cause the program to associate each of the electronic mail messages with at least one of the folders managed by the electronic mail client according to the folder rules. The computer readable program codes are further configured to receive a visibility condition specifying when a specified folder is not visible in a user interface of the electronic mail client. The specified folder is one of the folders managed by the electronic mail client. The computer readable program codes are further configured to cause the specified folder not to be visible in the user interface when the visibility condition is satisfied.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 demonstrates an example sequence of operations for managing electronic mail.

DETAILED DESCRIPTION OF THE INVENTION

The present invention is described with reference to embodiments of the invention. Throughout the description of the invention reference is made to FIGS. 1-4.

Figure 1:
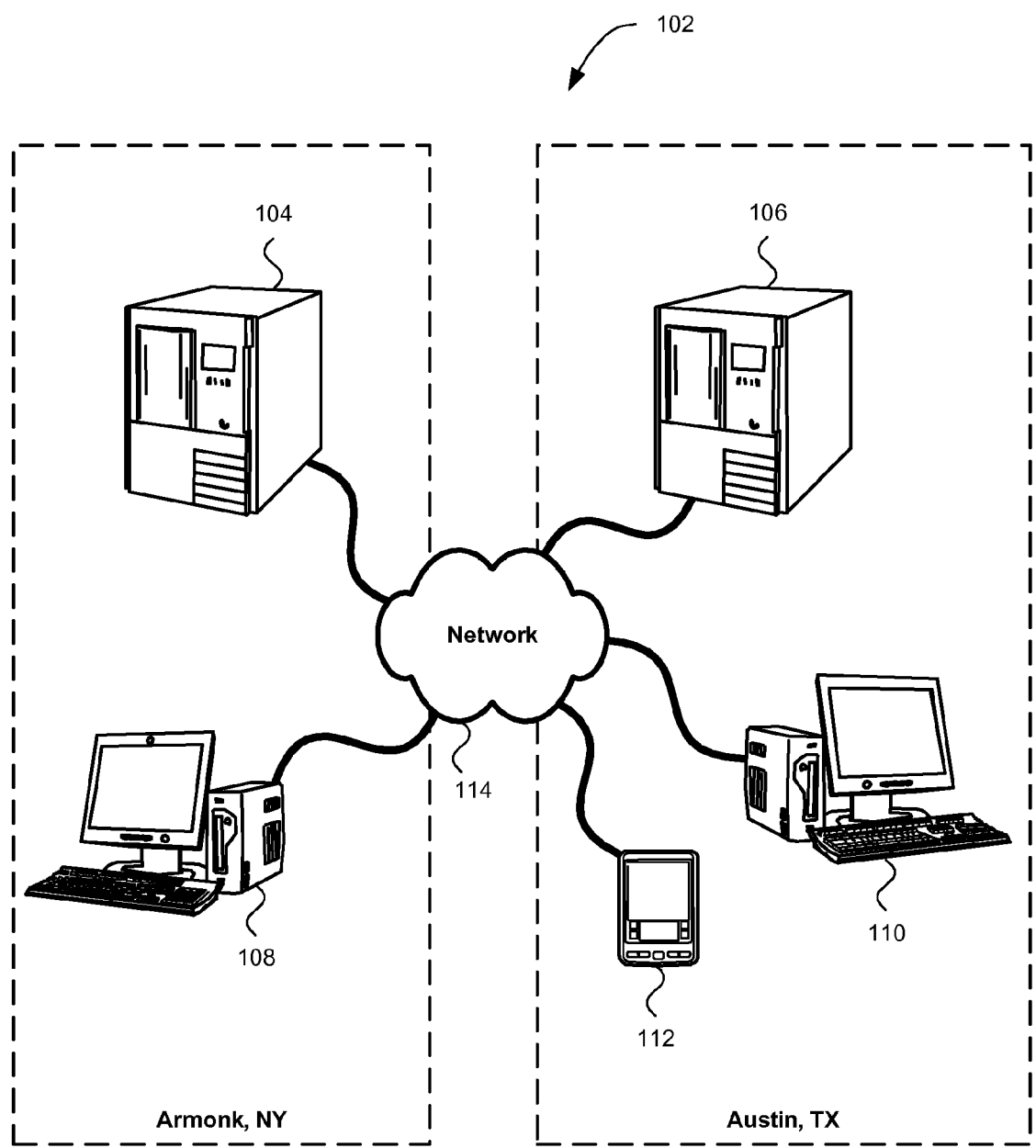
FIG. 1 shows an example environment embodying the present invention.

Turning to FIG. 1, an example environment 102 embodying the present invention is shown. It is initially noted that the environment 102 is presented for illustration purposes only, and is representative of countless configurations in which the invention may be implemented. Thus, the present invention should not be construed as limited to the environment configurations shown and discussed herein.

The environment 102 includes one or more electronic mail servers 104, 106. An electronic mail server is configured to receive and transmit mail on behalf of one or more users. Typically, an electronic mail server serves a relatively large number of users. For example, an electronic mail server may serve all users at an organization or a site.

An electronic mail server 104, 106 may be a general purpose computer. Such a computer may incorporate any of a wide variety of architectures. The computer may be based on a general purpose operating system such as the IBM® z/OS® operating system, the IBM AIX® operating system, the Linux® operating system, any flavor of the UNIX® operating system or the Windows® operating system. IBM, z/OS and AIX are registered trademarks of International Business Machines Corporation, Armonk, N.Y., United States, in the United States, other countries, or both. Linux® is the registered trademark of Linus Torvalds in the United States and other countries. UNIX is a registered trademark of The Open Group. Windows is a registered trademark of Microsoft Corporation, Redmond, Wash., United States, in the United States and/or other countries.

An electronic mail server may incorporate any of a wide variety of computer program products. Specifically, such computer program products may be configured to process electronic mail. Such computer program products may include the IBM Lotus® Domino® software and the Apache™ James™ software. Lotus and Domino are registered trademarks of International Business Machines Corporation, Armonk, N.Y., United States, in the United States, other countries, or both. Apache and James are trademarks of The Apache Software Foundation, Forest Hill, Md., United States.

An electronic mail server 104, 106 may receive and transmit mail by communicating with other electronic mail servers. The other electronic mail servers with which communication occurs may be at other, possibly distant locations on the Internet or another wide area network.

An electronic mail server 104, 106 may be connected to a variety of peripheral devices. Such peripheral devices may include a keyboard, a mouse and a display and one or more disk drives.

In the environment shown in FIG. 1, a first electronic mail server 104 is located at a site in Armonk, N.Y. A second electronic mail server 106 is located at a site in Austin, Tex.

It is emphasized that FIG. 1 shows two electronic mail servers 104, 106 solely to simplify the drawings. The number of electronic mail servers is not limited to two. To the contrary, the number of electronic mail servers may be arbitrarily large or small. In particular, the present invention may be employed in conjunction with the Internet, which includes literally millions of electronic mail servers. Conversely, the present invention may operate despite the presence of fewer than two electronic mail servers.

The environment 102 further includes one or more electronic mail clients 108, 110, 112. An electronic mail client is configured to receive and transmit mail on behalf of one or more users. Typically, an electronic mail client serves a relatively small number of users. In many cases, an electronic mail client belongs to a specific user and is used exclusively by that user.

An electronic mail client 108, 110, 112 may be a general purpose computer. Such a computer may incorporate any of a wide variety of architectures. The computer may be based on a general purpose operating system such as the IBM z/OS operating system, the IBM AIX operating system, the Linux operating system, any flavor of the UNIX operating system or the Windows operating system. An electronic mail client may also be a device other than a general purpose computer. Such devices may include hardware devices manufactured to perform a specific task. Such devices may also include personal digital assistants (PDA's) and mobile telephones. It is noted that the electronic mail clients may be heterogeneous. Specifically, they may differ from each other in architecture, operating system or other important respects.

An electronic mail client 108, 110, 112 may incorporate any of a wide variety of computer program products. Specifically, such computer program products may be configured to process electronic mail. Such computer program products may include the IBM Lotus Notes® client, the Thunderbird™ messaging and collaboration client and the Microsoft® Outlook® messaging and collaboration client. Lotus Notes is a registered trademark of International Business Machines Corporation, Armonk, N.Y., United States, in the United States, other countries, or both. Thunderbird is a trademark of the Mozilla Foundation, Mountain View, Calif., United States. Microsoft and Outlook are registered trademarks of Microsoft Corporation, Redmond, Wash., United States, in the United States and/or other countries.

An electronic mail client 108, 110, 112 may be connected to a variety of peripheral devices. Such peripheral devices may include a keyboard, a mouse and a display and one or more disk drives.

An electronic mail client 108, 110, 112 may receive and transmit mail by communicating with a predetermined electronic mail server 104, 106. An electronic mail client may be configured to transmit electronic mail messages, regardless of the recipient thereof, by initially transmitting the electronic mail messages to the predetermined electronic mail server. The predetermined electronic mail server may then retransmit each electronic mail message to an electronic mail server associated with the recipient of the electronic mail message.

In the environment shown in FIG. 1, a first electronic mail client 108 is located at the site in Armonk, N.Y. Thus, this electronic mail client is configured to communicate with the first electronic mail server 104. Both a second electronic mail client 110 and a third electronic mail client 112 are located at the site in Austin, Tex. Thus, both electronic mail clients are configured to communicate with the second electronic mail server 106.

It is emphasized that FIG. 1 shows three electronic mail clients 108, 110, 112 solely to simplify the drawings. The number of electronic mail clients is not limited to three. To the contrary, the number of electronic mail clients may be arbitrarily large or small. In particular, the present invention may be employed in conjunction with the Internet, which includes literally millions of electronic mail clients. Conversely, the present invention may operate despite the presence of fewer than three electronic mail clients.

The environment 102 further includes a network 114. The network may be any of a wide variety of systems known in the art for allowing two or more systems to communicate. The network may comprise any of a wide variety of networks such as the Internet, the public switched telephone network (PSTN), local area networks (LANs) and wide area networks (WANs). The network may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The network may include various topologies and protocols known to those skilled in the art, such as TCP/IP, UDP, and Voice over Internet Protocol (VoIP). The network may comprise direct physical connections, radio waves, microwaves or any combination thereof. Furthermore, the network may include various networking devices known to those skilled in the art, such as routers, switches, bridges, repeaters, etc.

The network 114 may comprise subnetworks. In the environment shown in FIG. 1, the site in Armonk, N.Y. is served by a first subnetwork. The site in Austin, Tex. is served by a second subnetwork.

In an embodiment of the present invention, an electronic mail client 108, 110, 112 downloads electronic mail messages from a predefined electronic mail server 104, 106. Such downloading may occur via the Post Office Protocol (POP). The electronic mail client manages electronic mail messages thus downloaded. In particular, one or more folders exist at the electronic mail client. Each electronic mail message received at the client is assigned to one or more of the folders. The electronic mail client may further be configured to allow a user to manipulate electronic mail messages located thereat.

In another embodiment of the present invention, an electronic mail client 108, 110, 112 accesses messages located at an electronic mail server 104, 106. Such access may occur via the Internet Message Access Protocol (IMAP). Specifically, one or more folders exist at the electronic mail server. Each electronic mail message received at the electronic mail server is assigned to one or more of the folders. The electronic mail client is configured to display to a user electronic mail messages located at the electronic mail server. The electronic mail client may further be configured to allow a user to manipulate electronic mail messages located at the electronic mail server. It is emphasized that as a result, the electronic mail client manages the electronic mail messages stored at the electronic mail server.

It is emphasized that the preceding embodiments are not mutually exclusive. An electronic mail server 104, 106 may be configured to implement both embodiments. Likewise, an electronic mail client 108, 110, 112 may be configured to implement both embodiments.

In either of the embodiments described above, each folder may represent a category of electronic mail messages. The folders may include a special folder known as the inbox. The inbox generally includes messages which have been received but have not yet been processed by the user.

However, the behavior described above may be modified by folder rules. A folder rule associates electronic mail messages with one or more folders. Specifically, a folder rule may specify that any electronic mail message matching the folder rule should be placed in a specified folder. For example, a folder rule may specify that any electronic mail message for which the electronic mail address of the sender is "information-requests@example.com" is to be associated with the "Information Requests" folder. If an electronic mail message is matched by the folder rule, it is placed in the folder specified by the folder rule instead of the inbox. (An exception would be if the folder specified by the folder rule is the inbox, although this is not usually the case.)

Many electronic mail messages are not urgent in nature. This principle is particularly likely to hold true in corporate environments. Non-urgent electronic mail messages may include "general forward" electronic mail messages. A "general forward" electronic mail message may be, for example, a carbon copy of a message for which another user is primarily responsible. Non-urgent electronic mail messages may also include personal electronic mail messages. Not only are such messages not urgent, but it may actually be preferable for the recipient thereof to completely ignore such messages during business hours. In general, it may be unnecessary or even disadvantageous for a user to immediately check, read or respond to a non-urgent electronic mail message.

Many users are tempted or prone to check electronic mail messages immediately upon receipt. This may be true whether the electronic mail message is associated with the inbox or another folder. In fact, an electronic mail client may encourage this behavior by highlighting, offsetting or otherwise drawing attention to unread electronic mail messages. Similarly, the electronic mail client may draw attention to folders containing unread electronic mail messages. For example, the electronic mail client may render the font of the folder in boldface. Moreover, some users simply dislike having unread electronic mail messages. Such users may read a non-urgent electronic mail message even if doing so would be an inefficient use of time.

According to the present invention, folder rules may be defined so that non-urgent electronic mail messages are associated with specified folders. Visibility conditions may then be defined specifying when the specified folders are visible in a user interface of an electronic mail client. For example, if the hours between 3 PM and 8 PM on weekdays are generally busy, visibility conditions may specify that the specified folders are not to be visible during those time periods. Because the specified folders contain non-urgent electronic mail messages in this example, the non-urgent electronic mail messages are not visible during the time periods specified by the visibility condition.

As a result, the user is discouraged from checking, reading or responding to non-urgent electronic mail messages during the time periods specified by the visibility condition. Thus, efficiency and time management are advantageously improved. This is the case because it takes at least some time to read, and possibly reply to, a non-urgent electronic mail message. Clearly, it is beneficial to avoid spending time in this manner, particularly during busy time periods. Accordingly, even if the user is discouraged from checking only a few non-urgent electronic mail messages per day, the time savings over long periods of time is significant.

Furthermore, by hiding non-urgent electronic mail messages, focus and concentration on high-priority work items is beneficially improved. Moreover, the ability to find high-priority electronic mail messages is advantageously increased, as the high-priority messages are not interspersed among non-urgent messages. Additionally, if a non-urgent electronic mail message is hidden, the user is discouraged from forwarding the non-urgent message to other parties within the organization. This is advantageous because it is also usually inefficient for the other parties to read or process the message. Such inefficiencies may be significant because the recipients of the forwarded message may themselves forward the message, thus repeating the inefficiencies for a few cycles. Overall, hiding non-urgent electronic mail messages according to the present invention beneficially increases convenience.

Figure 2:
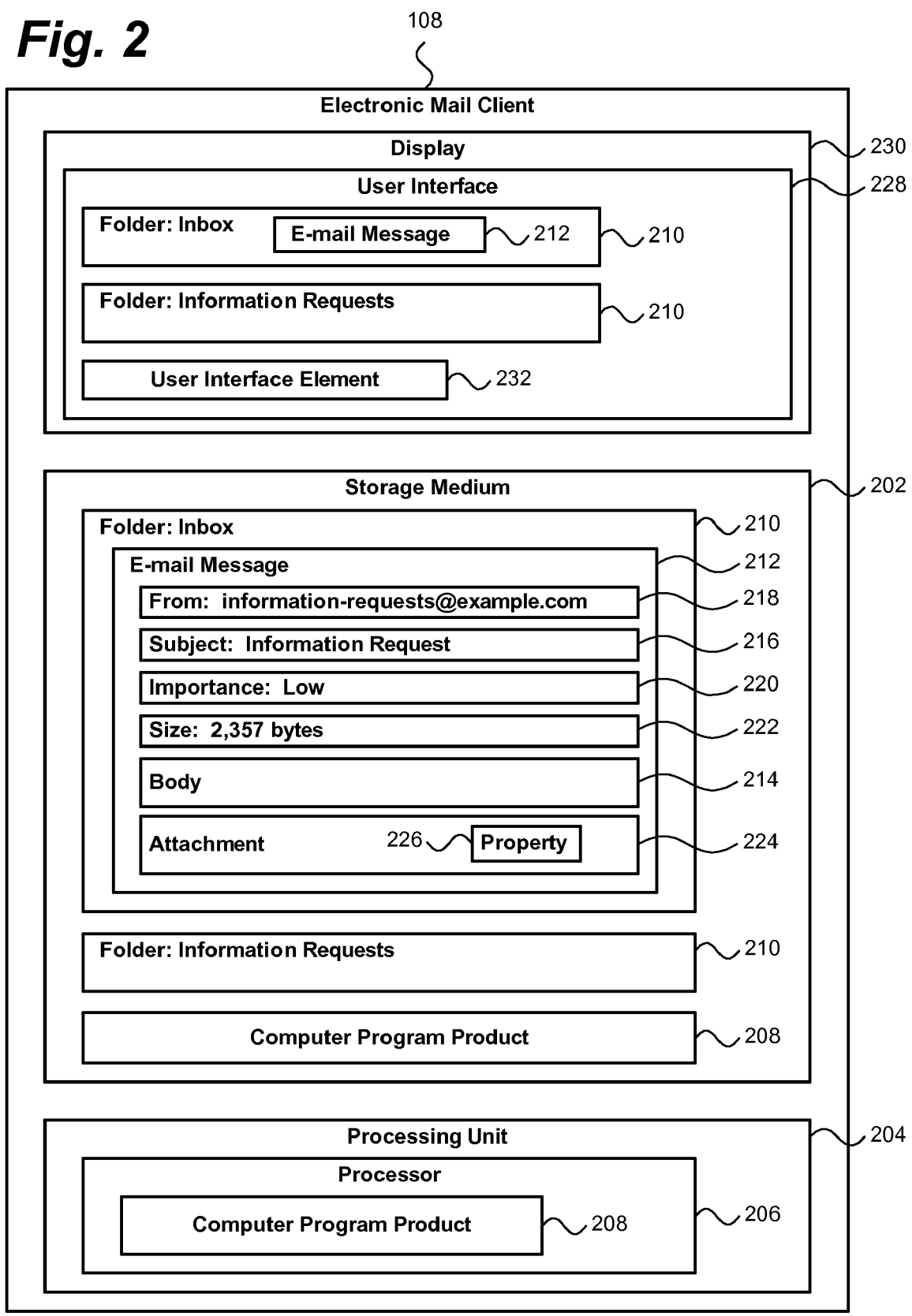
FIG. 2 illustrates additional detail about an example electronic mail client embodying the present invention.

Turning now to FIG. 2, additional detail about an example electronic mail client 108 embodying the present invention is illustrated.

The electronic mail client 108 comprises a storage medium 202 configured to store data in a computer usable format. The storage medium may comprise any of a variety of technological devices configured to store data. Such technological devices may include without limitation hard drives, optical drives, floppy drives, random access memory (RAM), read-only memory (ROM), and persistent memory (EPROM or Flash memory). In particular, the storage medium may be a computer usable memory.

The electronic mail client 108 further comprises a processing unit 204 embedded in hardware, software or a combination thereof. The processing unit may comprise one or more processors 206. Specifically, a processor comprised by the processing unit may be a general purpose microprocessor. Each processor comprised by the processing unit is configured to execute program code.

The electronic mail client 108 may incorporate any of a wide variety of computer program products 208. The computer program products may include any of the computer program products discussed above in regards to FIG. 1. Any of the computer program products may be embodied in a computer usable memory such as the storage medium 202. Furthermore, any of the computer program products may be implemented in computer readable program codes coupled to the computer usable memory. The computer readable program codes may be executed at a processing unit 204, a processor 206 comprised thereby, or both.

One or more folders 210 may be managed by the electronic mail client 108. The one or more folders may be stored in a computer usable memory such as the storage medium 202. As discussed above, the folders may include an inbox as well as additional folders representing categories of electronic mail messages. It is contemplated that a user may define any number of additional folders. Additionally, the user may define a structure for the folders. Notably, many electronic mail systems known in the art allow folders to be nested in a hierarchical structure. The functionality for defining additional folders beneficially allows a user to define a taxonomy for electronic mail messages which best suits the needs of the user.

It is emphasized that FIG. 2 shows two folders 210 solely to simplify the drawings. The number of folders is not limited to two. To the contrary, the number of folders may be arbitrarily large or small. However, it is contemplated that at least one folder, namely the inbox, will always exist.

Each folder 210 may have one or more electronic mail messages 212 associated therewith. The one or more electronic mail messages may be stored in a computer usable memory such as the storage medium 202.

An electronic mail message 212 was received at the electronic mail client 108 shown in FIG. 2. At this point in time, no folder rules have yet been defined in the electronic mail client 108. Therefore, the received electronic mail message 212 is associated with the inbox.

It is emphasized that FIG. 2 shows one electronic mail message 212 solely to simplify the drawings. The number of electronic mail messages is not limited to one. To the contrary, the number of electronic mail messages may be arbitrarily large or small.

As used herein, the term "folder" is a category of related electronic mail messages. A folder may be, but is not required to be, stored in a contiguous area within a computer usable memory. In particular, a folder may be a label assigned to one or more electronic mail messages. In this case, the label itself, the electronic mail messages to which the label is assigned, or both may be stored in a computer usable memory.

The present invention does not require that an electronic mail message is associated with at most one folder. However, many electronic mail clients and systems known in the art enforce this requirement. The present invention is compatible with this requirement when it is present.

Each electronic mail message 212 may include a body 214 containing the actual content of the message. The content may be of any of a plurality of media types, including without limitation text, Hypertext Markup Language (HTML), images and audio. More specifically, the media types may be identified using Multipurpose Internet Mail Extensions (MIME) types. Those skilled in the art will appreciate that MIME types are unique identifiers for a given type of medium. For example, "text/plain" represents plain text. The body may also have multiple parts, each of which may be of a different media type or MIME type.

An electronic mail message 212 may also have any of a plurality of properties. The properties may include metadata regarding the electronic mail message. Such metadata may be expressed in headers transmitted with the electronic mail message. The properties may also include observable data regarding the message. In particular, the properties may include a subject 216 of the electronic mail message. The properties may also include the electronic mail address of the sender 218 of the electronic mail message. The properties may also include an importance 220 of the electronic mail message. Those skilled in the art will appreciate that many electronic mail systems known in the art allow designating an electronic mail message as being of a relatively high importance or a relatively low importance. The importance may be designated by the sender of the electronic mail message. The properties may also include a size 222 of the electronic mail message.

An electronic mail message 212 may also have one or more attachments 224. Those skilled in the art will appreciate that an attachment is a file transmitted with an electronic mail message. As with the electronic mail message itself, attachments may have properties 226. Such properties may include metadata regarding the attachment and transmitted therewith, such as a MIME type of the data contained in the file or a name of the file. Such properties may also include observable data regarding the attachment, such as the size of the attachment.

The electronic mail client 108 may also include a user interface 228. The user interface may appear within a display 230. The user interface may further include non-visual elements, such as sounds.

The user interface 228 may display any or all of the folders 210 managed by the electronic mail client 108. The user interface 228 may also display any or all of the individual electronic mail messages 212 associated with each displayed folder.

The user interface 228 may also include one or more user interface elements 232. The user interface elements may include without limitation buttons, labels, text boxes, slide bars, check boxes, radio buttons, progress bars, menus, and other interface components or "widgets". Each user interface element may, when invoked by a user, cause functionality associated with the user interface element to be executed.

The user interface 228 may provide functionality allowing a user to manually move an electronic mail message from one folder to another folder. For example, a message in the inbox may be manually moved to a folder representing a category relevant to the message.

The user interface 228 may further provide functionality for allowing a user to define folder rules.

The user interface 228 may further provide functionality for allowing a user to define visibility conditions. If a visibility condition thus defined specifies that a folder is not to be visible at the current moment in time, the user interface may omit displaying the folder accordingly.

The user interface 228 may further provide functionality for configuring the electronic mail client 108. In particular, such functionality may allow specifying the identity of the predetermined electronic mail server with which the electronic mail client communicates, as described above in regards to FIG. 1.

It is emphasized that the structures shown in FIG. 2 are not required to be implemented in an electronic mail client 108. For example, the folders 210 and the electronic mail messages 212 may be stored at an electronic mail server such as any of the electronic mail servers shown in FIG. 1. The electronic mail client may therefore interface with the electronic mail server in order to display the folders and electronic mail messages stored thereat to a user.

Figure 3:
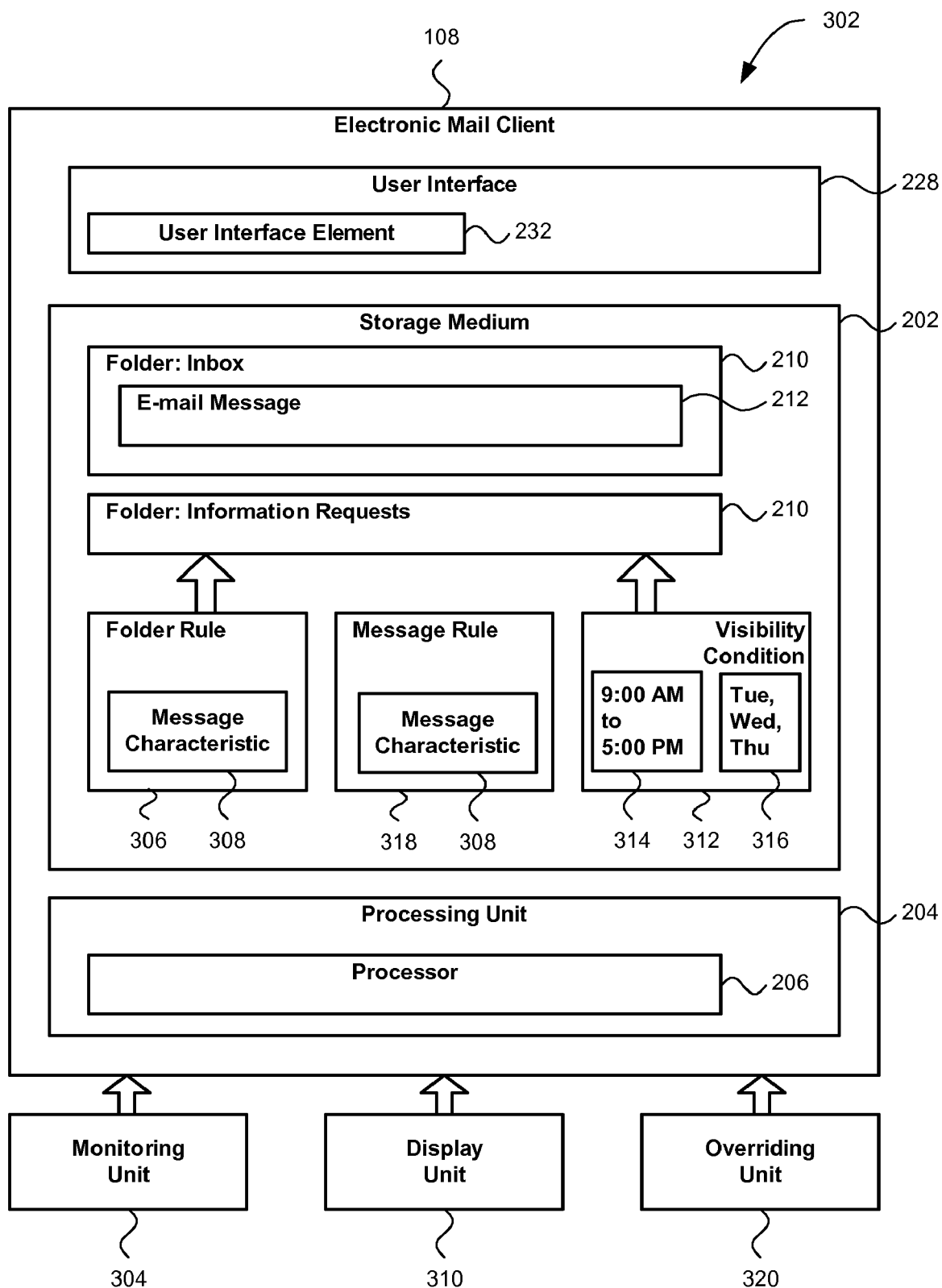
FIG. 3 illustrates an example system for managing electronic mail.

Turning now to FIG. 3, an example system 302 for managing electronic mail is illustrated.

The system 302 shown in FIG. 3 may exist within an environment such as the example environment shown in FIG. 1.

The system 302 may be included in, may comprise, or may interoperate with an electronic mail client 108. The electronic mail client may be the electronic mail client shown in FIGS. 1 and 2 and may have any of the properties described above in regards to FIGS. 1 and 2.

In particular, the electronic mail client 108 may comprise a storage medium 202 configured to store data in a computer usable format. The storage medium may be the storage medium included in the electronic mail client shown in FIG. 2 and may have any of the properties described above in regards to FIG. 2.

One or more folders 210 are managed by the electronic mail client 108. The folders may be the folders shown in FIG. 2 and may have any of the properties described above in regards to FIGS. 1 and 2. Notably, any or all of the folders may be stored in a computer usable memory such as the storage medium 202.

As discussed above in regards to FIG. 2, each folder 210 may have one or more electronic mail messages 212 associated therewith. The electronic mail messages may have any of the properties shown in FIG. 2 and described above in regards to FIG. 2.

The electronic mail client 108 has a user interface 228. The user interface may be the user interface shown in FIG. 2 and may have any of the properties described above in regards to FIG. 2. In particular, any of the folders 210 may be displayed in the user interface.

The system 302 comprises one or more processors 206. A processor may, in turn, be included in a processing unit 204. The processing unit may be the processing unit included in the electronic mail client shown in FIG. 2. Accordingly, a processor may be the processor included in the processing unit included in the electronic mail client shown in FIG. 2. The processing unit and any processor may have the properties described above in regards to FIG. 2. The processing unit may achieve any of the operations performed thereby by causing instructions to be executed by one or more of the processors.

The system 302 further comprises a monitoring unit 304. The monitoring unit may be implemented in hardware, software or a combination thereof. The monitoring unit may be a computer program product such as the computer program product shown in FIG. 2. The monitoring unit may achieve any of the operations performed thereby by causing instructions to be executed by a processing unit such as the processing unit 204 comprised by the electronic mail client 108, a processor 206 such as the example processor included in the system and comprised by the processing unit, or both. Moreover, the monitoring unit may, in performing any of the operations performed thereby, read data from, and write data to, a storage medium such as the storage medium 202 comprised by the electronic mail client.

The monitoring unit 304 is configured to receive one or more folder rules 306 for associating electronic mail messages with one or more folders 210. A folder rule may be received via a user interface 228.

The monitoring unit is further configured to monitor for new electronic mail messages 212. When one or more new electronic mail messages arrive, the monitoring unit is configured to receive the one or more electronic mail messages.

The monitoring unit 304 may then filter received electronic mail messages 212 according to the folder rules. Specifically, the monitoring unit is further configured to associate each of the one or more electronic mail messages with at least one of the one or more folders managed by the electronic mail client 108 according to the one or more folder rules.

In an embodiment of the present invention, the monitoring unit 304 is a daemon. Accordingly, the monitoring unit may also be referred to as the monitoring daemon. Those skilled in the art will appreciate that a daemon is a software process which executes in the background. Executing in the background may assist the monitoring unit in responding to external events, such as receiving an electronic mail message or receiving a folder rule.

It is emphasized that the monitoring unit 304 is not required to execute in the background. For example, the monitoring unit may be invoked by an external entity when an external event relevant to the monitoring unit occurs.

A folder rule 306 may be stored in a computer usable memory such as the storage medium 202. A folder rule 306 may be any rule associating electronic mail messages with one or more folders 210. A folder rule may act as a filter. As a result, electronic mail messages may be filtered based on the folder rule. A folder rule may be implemented using any of a variety of techniques for associating electronic mail messages with folders. Notably, folder rules may be implemented by agents.

Any or all of the folder rules 306 may specify a message characteristic 308 and a folder 210. In this case, the monitoring unit 304 is configured to perform additional subtasks within the operation of associating an electronic mail message 212 with at least one of the one or more folders managed by the electronic mail client 108. One such subtask is to determine whether the electronic mail message matches any of the message characteristics specified in the one or more folder rules. Another subtask is to associate the electronic mail message with the folder specified by the folder rule specifying the matched characteristic if the electronic mail message is determined to match one of the message characteristics specified in the one or more folder rules.

The message characteristic 308 may be any of a variety of identifiable characteristics of electronic mail messages 212. Such identifiable characteristics may include without limitation any of the properties of the electronic mail message shown in FIG. 2.

Specifically, the message characteristic 308 may be the sender of an electronic mail message 212. More specifically, the message characteristic may be the electronic mail address of the sender of the electronic mail message. The electronic mail message may be determined to match the message characteristic when the electronic mail address of the sender equals a specific value. Alternatively, the electronic mail message may be determined to match the message characteristic when the electronic mail address of the sender contains the specific value. Furthermore, many electronic mail systems known in the art enable transmitting a human-readable name for the sender in conjunction with the electronic mail address of the sender. The message characteristic may also be a specific value for this human-readable name. The electronic mail message may be determined to match the message characteristic when this human-readable name equals or contains a specific value.

The message characteristic 308 may also be text included in the subject of an electronic mail message 212. In this case, the electronic mail message may be determined to match the message characteristic when the subject of the electronic mail message is equal to this text. Alternatively, the electronic mail message may be determined to match the message characteristic when the subject of the electronic mail message contains this text.

The message characteristic 308 may also be text included in a body of an electronic mail message 212. In this case, the electronic mail message may be determined to match the message characteristic when the body of the electronic mail message contains this text.

The message characteristic 308 may also relate to the attachments of an electronic mail message 212. In particular, the message characteristic may be a property of attachments to the electronic mail message. The property may relate to the attachments as a group. For example, the property may be that the number of attachments is within a specified range. Accordingly, the electronic mail message may be determined to match the message characteristic when the number of attachments of the electronic mail message is within the specified range.

As used herein, the term "range" includes ranges which have an upper bound, a lower bound, or both. Moreover, the term "range" includes ranges wherein the upper bound and lower bound are the same. In this case, only the single value contained in both the upper bound and the lower bound is matched by the range.

The property may also be a property of a specific attachment. Such properties may include any of the properties of attachments discussed above in regards to FIG. 2. Specifically, the message characteristic 308 may be a specific value found in metadata regarding an attachment and transmitted therewith, such as a MIME type of the data contained in the attached file or a name of the attached file. In this case, an electronic mail message 212 for which the transmitted metadata regarding an attachment contains the specific value may be may be determined to match the message characteristic. The message characteristic may also be that observable data regarding the attachment matches a specific value. Notably, the message characteristic may be that the size of an attachment is within a range of sizes. In this case, an electronic mail message having an attachment with a size within this range may be determined to match the message characteristic.

The message characteristic 308 may also be an importance of an electronic mail message 212. Specifically, the message characteristic 308 may be a specific value for the importance of the electronic mail message. In this case, the electronic mail message may be determined to match the message characteristic when the importance of the electronic mail message equals the specific value. The message characteristic may also be a set of specific values for the importance of the electronic mail message. In this case, the electronic mail message may be determined to match the message characteristic when the importance of the electronic mail message is a member of the set of specific values.

The message characteristic 308 may also be a range of sizes of an electronic mail message. In this case, an electronic mail message having a size within this range may be determined to match the message characteristic.

A folder rule 306 is not limited to having one message characteristic 308. To the contrary, a folder rule may have multiple message characteristics. Such message characteristics may influence each other in a variety of ways. An electronic mail message may be required to match all of a plurality of message characteristics specified in a folder rule in order to be associated with the folder specified by the folder rule. As another alternative, a folder rule may include a plurality of message characteristics which are combined using Boolean operators. If the resulting expression evaluates to True for an electronic mail message, the electronic mail message may be associated with the folder specified by the folder rule.

Moreover, a folder rule 306 is not limited to specifying one folder 210. To the contrary, a folder rule 306 may specify a plurality of folders. In this case, an electronic mail message 212 matching the folder rule may be associated with each folder specified by the folder rule.

The system 302 further comprises a display unit 310. The display unit may also be referred to as the display manager. The display unit may be implemented in hardware, software or a combination thereof. The display unit may be a computer program product such as the computer program product shown in FIG. 2. The display unit may achieve any of the operations performed thereby by causing instructions to be executed by a processing unit such as the processing unit 204 comprised by the electronic mail client 108, a processor 206 such as the example processor included in the system and comprised by the processing unit, or both. Moreover, the display unit may, in performing any of the operations performed thereby, read data from, and write data to, a storage medium such as the storage medium 202 comprised by the electronic mail client.

The display unit 310 is configured to display different views of the mailbox of a user. Specifically, the display unit 310 displays folders 210 included in the mailbox. The display unit displays electronic mail messages 212 associated with displayed folders.

The display unit 310 is also configured to show or hide folders 210 during the time periods specified by a user via visibility conditions 312. To achieve this goal, the display unit is configured to receive a visibility condition. The visibility condition relates to a specified folder which is one of the one or more folders managed by the electronic mail client 108. A visibility condition may be stored in a computer usable memory such as the storage medium 202.

A visibility condition 312 may specify when the specified folder 210 is visible in the user interface 228 of the electronic mail client 108. In this case, the display unit 310 is configured to cause the specified folder not to be visible in the user interface when the visibility condition is not satisfied.

Conversely, a visibility condition 312 may specify when the specified folder 210 is not visible in the user interface 228 of the electronic mail client 108. In this case, the display unit 310 is configured to cause the specified folder not to be visible in the user interface when the visibility condition is satisfied.

The visibility condition 312 may include at least one range of times 314 within a day. In this case, the visibility condition is satisfied only if a current time is within the range of times.

The visibility condition 312 may also include at least one range of days 316 within a week. In this case, the visibility condition is satisfied only if a current day is within the range of days. It is emphasized that a range of days may include only a single day of the week. For example, suppose that workflow requirements dictate that a specific category of messages are to be processed only on Wednesdays. A folder 210 containing messages of this category may have a visibility condition specifying that the folder is only visible on Wednesdays.

In an embodiment of the present invention, the display unit 310 is integrated with the user interface 228 of an electronic mail client 108. The electronic mail client allows creating and altering various characteristics of folders 210. Specifically, the characteristics of a folder may be modified using the Properties view of the folder. The Properties view may be any of a variety of user interface screens or devices for selecting and altering specific attributes or properties of the folder. The Properties view of a folder may be accessed by clicking on the folder using the right mouse button. The Properties view is enhanced according to the present invention to include a new attribute field via which the user may specify a visibility condition 312 for the folder. Specifically, the user may specify temporal information regarding when the folder is visible in this attribute field.

In another embodiment of the present invention, visibility conditions 312 are specified using a user interface 228 which is distinct from the electronic mail client 108. This distinct user interface may also include an attribute field via which the user may specify a visibility condition 312 for the folder. As in the preceding embodiment, the user may specify temporal information regarding when the folder is visible in this attribute field.

In either embodiment described above, the temporal information may include without limitation exact times, days, weeks and dates. The attribute field may specify that the folder should be visible at the specified times. The attribute field may instead specify that the folder should be hidden at the specified times. Accordingly, by specifying a value for the attribute field, an end user may control the exact times during which the folder will be displayed or will be hidden.

The attribute field may specify, "Show this folder only between (_hh_:_mm_) time to (_hh_:_mm_) time on (_XXX_) days of the week." In this case, the times, days or both which are entered by the user are included in a visibility condition 312 specifying that the folder 210 is visible during the specified times and days.

The attribute field may specify, instead or additionally, "Hide this folder between (_hh_:_mm_) time to (_hh_:_mm_) time on (_XXX_) days of the week." In this case, the times, days or both which are entered by the user are included in a visibility condition 312 specifying that the folder 210 is not visible during the specified times and days.

In either of the fields described above, "_hh_" represents an hour. The hour may be represented by a 24-hour clock. Accordingly, the hour may range from 0 to 23 or may range from 1 to 24. The hour may also be represented by a 12-hour clock with the ability to select between "AM" and "PM". The hour may be selected using any of a variety of user interface elements known in the art. Such user interface elements may include text fields and drop-down menus.

Similarly, in either of the fields described above, "_mm_" represents a minute. The minute may range from 0 to 59. The minute may be selected using any of a variety of user interface elements known in the art. Such user interface elements may include text fields and drop-down menus.

Likewise, in either of the fields described above, "_XXX_" represents a day of the week. The days may be the days of the Gregorian calendar, namely Sunday, Monday, Tuesday, Wednesday, Thursday, Friday and Saturday. The days may be abbreviated to conserve space. For example, each day may be abbreviated to its first three letters. The days of the week may be selected using any of a variety of user interface elements known in the art. Such user interface elements may include check boxes and drop-down menus. The user interface elements may allow multiple days of the week to be selected.

It is noted that failing to select any day of the week may cause the visibility condition 312 not to include a day of the week. Conversely, failing to select a time range may cause the visibility condition 312 not to include a time range.

In an embodiment of the present invention, the monitoring unit 304 is further configured to receive at least one message rule 318 specifying when electronic mail messages 212 matching a message characteristic 308 are not visible in the user interface 228. The message rule may be received via a user interface 228. A message rule may be stored in a computer usable memory such as the storage medium 202. The message characteristic may be any of the message characteristics described above in regards to folder rules. Moreover, the message rule may specify when matching messages are not visible using a visibility condition as described above or the like.

In this embodiment, the monitoring unit 304 is further configured to determine whether an electronic mail message matches the message characteristic included in a message rule. Accordingly, the display unit 310 is further configured to cause the electronic mail message not to be visible in the user interface in accordance with the message rule if the electronic mail message is determined to match the message characteristic. It is emphasized that as a result, the present invention may advantageously control the visibility of individual electronic mail messages as well as entire folders.

A message rule 318 may be a global setting. Specifically, a message rule may apply to electronic mail messages regardless of the folder with which the electronic mail message is associated.

The system 302 further comprises an overriding unit 320. The overriding unit may be implemented in hardware, software or a combination thereof. The overriding unit may be a computer program product such as the computer program product shown in FIG. 2. The overriding unit may achieve any of the operations performed thereby by causing instructions to be executed by a processing unit such as the processing unit 204 comprised by the electronic mail client 108, a processor 206 such as the example processor included in the system and comprised by the processing unit, or both. Moreover, the overriding unit may, in performing any of the operations performed thereby, read data from, and write data to, a storage medium such as the storage medium 202 comprised by the electronic mail client.

The overriding unit 320 is configured to provide a user interface element 232. The user interface element may be the user interface element shown in FIG. 2 and may have any of the properties described above in regards to FIG. 2.

The user interface element may pertain to a specific folder 210. In this case, the user interface element 232 may be a check box within the Properties view of the folder. Such a check box pertains exclusively to the folder for which it is included in the Properties view. A separate user interface element may be provided for each folder.

The user interface element may instead pertain to all folders. In this case, the user interface element 232 may also be a check box at a system-wide or global level.

In either case, the check box may be interpreted in one of two ways. The first possibility is that checking the check box is interpreted as activating the user interface element 232. In this case, unchecking the check box is interpreted as deactivating the user interface element. The second possibility is that unchecking the check box is interpreted as activating the user interface element. In this case, checking the check box is interpreted as deactivating the user interface element.

The user interface elements 232 described above are not mutually exclusive. To the contrary, both a check box for individual folders and a global check box may be provided simultaneously.

The overriding unit 320 is further configured to cause the folder 210 specified by a visibility condition 312 to be visible whether or not the visibility condition is satisfied when the user interface element 232 is activated.

If the activated user interface element 232 pertains to a specific folder 210, this folder may be caused to be visible regardless of a visibility condition 312 which is applicable to this folder. Thus, the folder specified by the visibility condition is visible whether or not the visibility condition is satisfied when the user interface element is activated.

If instead the activated user interface element 232 pertains to all folders 210, all folders may be caused to be visible regardless of any visibility conditions applicable to the folders. Thus, the folder specified by any visibility condition will be visible whether or not the visibility condition is satisfied when the user interface element is activated. It is emphasized that as a result, the visibility conditions may be disabled for all folders within an electronic mail client 108 by a single user action. Moreover, in this case, all electronic mail messages 212 may be caused to be visible regardless of any message rules applicable to the electronic mail messages.

Turning now to FIG. 4, an example sequence of operations for managing electronic mail is demonstrated.

The operations shown in FIG. 4 may be performed by one or more computer program products such as the computer program product shown in FIG. 2, except where otherwise noted. As described above, the computer program product may be implemented in computer readable program codes which are executed at a processor. Therefore, any of the operations performed by the computer program product may be performed at a processor.

The operations shown in FIG. 4 may be performed within an environment such as the environment shown in FIG. 1 and described above in regards to FIG. 1. Moreover, the operations shown in FIG. 4 may operate on one or more folders managed by an electronic mail client. The folders may be the folders shown in FIG. 2 and may have any of the properties described above in regards to FIGS. 1 and 2. Notably, the folders may be stored in a computer usable memory. As discussed above in regards to FIG. 2, electronic mail messages may be associated with folders. The electronic mail messages may have any of the properties shown in FIG. 2 and described above in regards to FIG. 2.

At receiving operation 402, one or more folder rules for associating electronic mail messages with one or more folders are received. As discussed above, the folders may be managed by an electronic mail client and stored in a computer usable memory. A folder rule may be the folder rule shown in FIG. 3 and may have any of the properties described above in regards to FIG. 3. Receiving operation 402 may be performed by a monitoring unit such as the monitoring unit shown in FIG. 3.

Receiving operation 402 may accept user input via a user interface such as the user interface shown in FIGS. 2 and 3. Thus, a user may interact with such a user interface in order to specify the folder rules. The user may first identify characteristics of electronic mail messages which have a relatively low priority. The user may then create folder rules in order to filter the electronic mail messages and place the electronic mail messages in folders deemed appropriate by the user.

After receiving operation 402 is completed, control passes to receiving operation 404.

At receiving operation 404, at least one message rule specifying when electronic mail messages matching a message characteristic are not visible in the user interface is received. A message rule may be the message rule shown in FIG. 3 and may have any of the properties described above in regards to FIG. 3. The message characteristic may be any of the characteristics described above in regards to receiving operation 402. Receiving operation 404 may be performed by a monitoring unit such as the monitoring unit shown in FIG. 3.

Receiving operation 404 may accept user input via a user interface such as the user interface shown in FIG. 2. Thus, a user may interact with such a user interface in order to specify the message rules. The user may first identify characteristics of electronic mail messages which have a relatively low priority. The user may then create message rules so that messages having these characteristics are not visible at specified times.

After receiving operation 404 is completed, control passes to receiving operation 406.

At receiving operation 406, one or more electronic mail messages are received. The electronic mail messages may be received from an electronic mail server such as any of the electronic mail servers shown in FIG. 1. The electronic mail messages may be received according to either of the embodiments described above in regards to FIG. 1 for receiving electronic mail messages. Receiving operation 406 may be performed by a monitoring unit such as the monitoring unit shown in FIG. 3. After receiving operation 406 is completed, control passes to associating operation 408.

At associating operation 408, each of the one or more electronic mail messages received at receiving operation 406 is associated with at least one of the one or more folders managed by the electronic mail client according to the one or more folder rules. Associating operation 408 may be performed by a monitoring unit such as the monitoring unit shown in FIG. 3.

Associating an electronic mail message with a folder may comprise placing the electronic mail message in the folder or moving the electronic mail message to the folder. Associating an electronic mail message with a folder may also comprise any other technique for labeling the electronic mail message as being included in the folder.

Associating operation 408 may include applying any or all of the folder rules to an electronic mail message in sequence. If an electronic mail message matches a folder rule, the monitoring unit associates the electronic mail message with the folder specified by the folder rule. As discussed above in regards to FIG. 3, each of the one or more folder rules may specify a message characteristic and a folder. In this case, associating an electronic mail message with at least one of the one or more folders managed by the electronic mail client may comprise determining whether the electronic mail message matches any of the message characteristics specified in the one or more folder rules. If the electronic mail message is determined to match one of the message characteristics specified in the one or more folder rules, the electronic mail message is associated with the folder specified by the folder rule specifying the matched characteristic.

An electronic mail message may fail to be matched by any of the folder rules. This may occur if the electronic mail message does not match any of the message characteristics specified in any of the folder rules. In this case, the electronic mail message may be associated with the inbox.

An electronic mail message may also be matched by two or more folder rules. This may occur if the electronic mail message matches different message characteristics specified in different folder rules. In this case, any of a variety of algorithms may be employed to determine the folder with which the electronic mail message should be associated. For example, each folder rule may have a priority, and the electronic mail message may be associated with the folder specified by the folder rule having the greatest priority. Instead, applying folder rules to the electronic mail message may terminate once a folder rule is determined to match the electronic mail message.

After associating operation 408 is completed, control passes to receiving operation 410.

At receiving operation 410, at least one visibility condition is received. A visibility condition may be the visibility condition shown in FIG. 3 and may have any of the properties described above in regards to FIG. 3. Receiving operation 410 may be performed by a display unit such as the display unit shown in FIG. 3.

Specifying visibility conditions beneficially enables a user to set time ranges for viewing each folder which are appropriate for the level of importance of the filtered mail in each folder. For example, one folder may include electronic mail which is personal in nature. A user may configure the visibility condition for this folder so that the folder can only be viewed during non-business hours. Another folder may include electronic mail which is work-related but of a relatively low priority. A user may configure the visibility condition for the latter folder so that the electronic mail messages included in the folder can only be read during times of the work day specified by the user.

After receiving operation 410 is completed, control passes to causing operation 412.

At causing operation 412, the visibility of each folder specified by a visibility condition is updated based on the visibility condition. Specifically, if the visibility condition specifies when the specified folder is visible, the specified folder is caused not to be visible in the user interface when the visibility condition is not satisfied. If instead the visibility condition specifies when the specified folder is not visible, the specified folder is caused not to be visible in the user interface when the visibility condition is satisfied. Causing operation 412 may be performed by a display unit such as the display unit shown in FIG. 3.

Showing a folder and causing a folder to be visible may include any method of transmitting any or all of the contents of the folder, including any or all of the electronic mail messages associated therewith, to a user. Such transmission may be visual in nature, such as by displaying the contents of the folder on a display. In this case, the user may view the folder and any or all of the electronic mail messages associated therewith. Such transmission may also occur via non-visual modalities.

Conversely, hiding a folder and causing a folder not to be visible may include any method of causing any or all of the contents of the folder, again including any or all of the electronic mail messages associated therewith, not to be transmitted to the user. Thus, as a result of hiding the folder, the user may be unable to view the folder and any electronic mail messages associated therewith. More generally, no indication may be transmitted to the user of the contents of the folder or even that the folder exists.

Causing operation 412 may be executed according to the current time and date. It is emphasized that two ramifications result from this fact. First, the result of causing operation 412 varies depending on the time and date at which it is performed. This is the case even if the visibility conditions do not change. Thus, a folder may be caused to be visible at a first moment in time and caused to be hidden at a second moment in time, even if the visibility conditions were not altered in the interim.

Second, causing operation 412 may need to be repeated periodically to account for changes in the current time and date. For example, a folder rule may specify that a folder should be visible except between 9:00 AM and 5:00 PM. If causing operation 412 is performed at 4:45 PM, the folder should be caused to be hidden. However, at 5:00 PM, the folder should automatically be caused to be visible. Such periodic recalculations may be triggered according to any of a variety of techniques known in the art for periodically repeating a given task.

Causing operation 412 may determine the current time and date by accessing the system time. Those skilled in the art will appreciate that most modern computing systems comprise a real-time clock which is aware of the current time and date. Moreover, most operating systems provide a system call by which the real-time clock can be accessed.

After causing operation 412 is completed, control passes to determining operation 414.

At determining operation 414, it is determined whether an electronic mail message matches the message characteristic specified by a message rule. Determining operation 414 may be performed by a display unit such as the display unit shown in FIG. 3. If the electronic mail message matches the message characteristic, control passes to causing operation 416. If the electronic mail message does not match the message characteristic, control passes to providing operation 418.

At causing operation 416, the electronic mail message is caused not to be visible in the user interface in accordance with the message rule. The message rule may be interpreted as described above in regards to FIG. 3. It is noted that as a result of determining operation 414, this occurs only if the electronic mail message is determined to match the message characteristic specified by the message rule. Causing operation 416 may be performed by a display unit such as the display unit shown in FIG. 3. After causing operation 416 is completed, control passes to providing operation 418.

It is noted that determining operation 414, and causing operation 416 when invoked thereby, may be repeated for each of a plurality of electronic mail messages. The plurality of electronic mail messages may include all electronic mail messages received at receiving operation 406. The plurality of electronic mail messages may also include all electronic mail messages currently stored at an electronic mail client. Similarly, determining operation 414, and causing operation 416 when invoked thereby, may be repeated for each of a plurality of message rules. Moreover, both types of repetitions may be performed as a nested loop.

At providing operation 418, a user interface element is provided. The user interface element may be the user interface element shown in FIG. 2 and may have any of the properties described above in regards to FIG. 2. Providing operation 418 may be performed by an overriding unit such as the display unit shown in FIG. 3. After providing operation 418 is completed, control passes to waiting operation 420.

At waiting operation 420, an idle state occurs until an event is detected.

Waiting operation 420 may detect that a user interface element provided at providing operation 418 is activated. If the user interface element pertains to a specific folder, this folder may be caused to be visible regardless of a visibility condition which is applicable to this folder. This may be achieved by invoking functionality at an overriding unit such as the overriding unit shown in FIG. 3. Thus, the folder specified by the visibility condition is visible whether or not the visibility condition is satisfied when the user interface element is activated.

If instead the user interface element pertains to all folders, all folders may be caused to be visible regardless of any visibility conditions applicable to the folders. Again, this may be achieved by invoking functionality at an overriding unit such as the overriding unit shown in FIG. 3. Thus, the folder specified by any visibility condition will be visible whether or not the visibility condition is satisfied when the user interface element is activated. It is emphasized that as a result, the visibility conditions may be disabled for all folders within an electronic mail client by a single user action.

Waiting operation 420 may instead detect that the user interface element provided at providing operation 418 is deactivated. When this condition is detected, if the user interface element pertains to a specific folder, this folder may be caused to again be visible or not visible according to the visibility condition applicable to the specific folder. If instead the user interface element is global, all folders may be caused to again be visible or not visible according to the visibility conditions. Again, this may be achieved by invoking functionality at an overriding unit such as the overriding unit shown in FIG. 3.

Waiting operation 420 may also detect that a new folder rule has been received. In this case, receiving operation 402 may be repeated in order to receive and process the new folder rule. Additionally, associating operation 408 may be repeated to process previously received electronic mail messages according to the new folder rule.

Waiting operation 420 may also detect that a new message rule has been received. In this case, receiving operation 404 may be repeated in order to receive and process the new message rule. Additionally, associating operation 408 may be repeated to process previously received electronic mail messages according to the new message rule.

Waiting operation 420 may also detect that a new message rule has been received. In this case, receiving operation 404 may be repeated in order to receive and process the new message rule. Additionally, determining operation 414 (and possibly causing operation 416) may be repeated to process previously received electronic mail messages according to the new message rule.

Waiting operation 420 may also detect that a new electronic mail message has been received. In this case, receiving operation 406 may be repeated in order to receive and process the new electronic mail message. Additionally, associating operation 408 may be repeated to associate the electronic mail message with a folder according to the current folder rules. Moreover, determining operation 414 (and possibly causing operation 416) may be repeated to process the new electronic mail message according to the current message rules.

Waiting operation 420 may also detect that a new visibility condition has been received. In this case, receiving operation 410 may be repeated in order to receive and process the new visibility condition. Additionally, causing operation 412 may be repeated to update the visibility of the folder specified by the visibility condition.

Waiting operation 420 may also periodically cause the visibility or invisibility of folders, individual electronic mail messages, or both to be recalculated. This calculation, the updated display changes, or both may be achieved by invoking functionality at a display unit such as the display unit shown in FIG. 3. It is emphasized that as a result, the folders are rendered viewable by the reader during, and only during, the appropriate time windows as specified by a user.

Periodically recalculating the visibility or invisibility of folders, individual electronic mail messages, or both may be achieved by repeating causing operation 412, determining operation 414 (and possibly causing operation 416), or both at periodic intervals. Such periodic recalculation may also be achieved by tracking the beginning and the end of each time range specified by a visibility condition. At the beginning and the end of any such time range, the specified folder may be caused to be visible or not visible based on the visibility condition. Similarly, for time ranges specified in a message rule, electronic mail messages matching the message characteristic specified in the message rule may be caused to be visible or not visible based on the visibility condition.

Thus, consider a visibility condition specifying a time range during which a specified folder is to be hidden. To simplify the example, the visibility condition does not vary depending on the day of the week. When the current system time matches the beginning of the time range, waiting operation 420 may cause the specified folder to be hidden from a user. As a result, any new electronic mail messages arriving which are associated with this folder will not be highlighted. It is emphasized that the user is therefore not distracted by these electronic mail messages.

When the current system time matches the end of the time range, waiting operation 420 may cause the specified folder to be visible to the user again. It is emphasized that as a result, the user will be able to see any electronic mail message which was received since the time the folder was hidden and which was associated with the folder.

Finally, waiting operation 420 may detect a user request to close the electronic mail client. In this case, processing terminates.

Another aspect of the invention is directed to embodiments that can be embodied in the form of computer-implemented processes and apparatuses for practicing those processes, which is now described with reference to FIG. 5. For example, the computer implemented operations for managing electronic mail are embodied in computer program code executed by computer processors.

Embodiments include a computer program product 502 as depicted in FIG. 5 on a computer usable medium 504 with computer program code logic 506 containing instructions embodied in tangible media as an article of manufacture. Exemplary articles of manufacture for computer usable medium 504 may include floppy diskettes, CD-ROMs, hard drives, universal serial bus (USB) flash drives, or any other computer-readable storage medium, wherein, when the computer program code logic 506 is loaded into and executed by a computer, the computer becomes an apparatus for practicing the invention.

Embodiments include computer program code logic 506, for example, whether stored in a storage medium, loaded into and/or executed by a computer, wherein, when the computer program code logic 506 is loaded into and executed by a computer, the computer becomes an apparatus for practicing the invention. When implemented on a general-purpose microprocessor, the computer program codes configure the microprocessor to create specific logic circuits.

Additionally, at least one program storage device readable by a machine, tangibly embodying at least one program of instructions executable by the machine to perform the capabilities of the system can be provided. The article of manufacture can be included as a part of a computer system or sold separately.

The capabilities of the operations for managing electronic mail can be implemented in software, firmware, hardware or some combination thereof. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for managing electronic mail, the method comprising:
receiving one or more folder rules for associating electronic mail messages with one or more folders managed by an electronic mail client and stored in a computer usable memory;
receiving one or more electronic mail messages;
associating each of the one or more electronic mail messages with at least one of the one or more folders managed by the electronic mail client according to the one or more folder rules;
receiving a visibility condition, the visibility condition comprising a user defined timing specifying when a specified folder is visible in a user interface of the electronic mail client, the specified folder being one of the one or more folders managed by the electronic mail client; and
causing, by a processor, the specified folder not to be visible in the user interface when the visibility condition is not satisfied.

2. The method of claim 1, wherein the visibility condition includes at least one range of times within a day and the visibility condition is satisfied only if a current time is within the range of times.

3. The method of claim 1, wherein the visibility condition includes at least one range of days within a week and the visibility condition is satisfied only if a current day is within the range of days.

4. The method of claim 1, further comprising:
providing a user interface element; and
causing the specified folder to be visible whether or not the visibility condition is satisfied when the user interface element is activated.

5. The method of claim 1, wherein:
each of the one or more folder rules specifies a message characteristic and a folder; and
wherein associating the electronic mail message with at least one of the one or more folders managed by the electronic mail client comprises:
determining whether the electronic mail message matches any of the message characteristics specified in the one or more folder rules; and
if the electronic mail message is determined to match one of the message characteristics specified in the one or more folder rules, associating the electronic mail message with the folder specified by the folder rule specifying the matched characteristic.

6. The method of claim 1, further comprising:
receiving at least one message rule specifying when electronic mail messages matching a message characteristic are not visible in the user interface;
determining whether an electronic mail message matches the message characteristic; and
causing the electronic mail message not to be visible in the user interface in accordance with the message rule if the electronic mail message is determined to match the message characteristic.

7. The method of claim 6, wherein the message characteristic is an element selected from the group of an electronic mail address of a sender of the electronic mail message, text included in a subject of the electronic mail message, text included in a body of the electronic mail message, a property of attachments to the electronic mail message, an importance of the electronic mail message, and a range of sizes of the electronic mail message.

8. A system for managing electronic mail, the system comprising:
a processor;
a monitoring unit configured to receive one or more folder rules for associating electronic mail messages with one or more folders managed by an electronic mail client, to receive one or more electronic mail messages, and to associate each of the one or more electronic mail messages with at least one of the one or more folders managed by the electronic mail client according to the one or more folder rules; and
a display unit configured to receive a visibility condition, the visibility condition comprising a user defined timing specifying when a specified folder is visible in a user interface of the electronic mail client, the specified folder being one of the one or more folders managed by the electronic mail client, and to cause the specified folder not to be visible in the user interface when the visibility condition is not satisfied.

9. The system of claim 8, wherein the visibility condition includes at least one range of times within a day and the visibility condition is satisfied only if a current time is within the range of times.

10. The system of claim 8, further comprising an overriding unit configured to provide a user interface element and to cause the specified folder to be visible whether or not the visibility condition is satisfied when the user interface element is activated.

11. The system of claim 8, wherein:
each of the one or more folder rules specifies a message characteristic and a folder; and
wherein associating the electronic mail message with at least one of the one or more folders managed by the electronic mail client comprises:
determining whether the electronic mail message matches any of the message characteristics specified in the one or more folder rules; and
if the electronic mail message is determined to match one of the message characteristics specified in the one or more folder rules, associating the electronic mail message with the folder specified by the folder rule specifying the matched characteristic.

12. The system of claim 8, wherein the monitoring unit is further configured to receive at least one message rule specifying when electronic mail messages matching a message characteristic are not visible in the user interface and to determine whether an electronic mail message matches the message characteristic; and
wherein the display unit is further configured to cause the electronic mail message not to be visible in the user interface in accordance with the message rule if the electronic mail message is determined to match the message characteristic.

13. The system of claim 12, wherein the message characteristic is an element selected from the group of an electronic mail address of a sender of the electronic mail message, text included in a subject of the electronic mail message, text included in a body of the electronic mail message, a property of attachments to the electronic mail message, an importance of the electronic mail message, and a range of sizes of the electronic mail message.

14. A computer program product stored in a non-transitory computer readable storage medium comprising:
computer readable program codes stored in the computer readable storage medium for managing electronic mail, the computer readable program codes configured to cause the program to:

receive one or more folder rules for associating electronic mail messages with one or more folders managed by an electronic mail client;

receive one or more electronic mail messages;

associate each of the one or more electronic mail messages with at least one of the one or more folders managed by the electronic mail client according to the one or more folder rules;

receive a visibility condition, the visibility condition comprising a user defined timing specifying when a specified folder is not visible in a user interface of the electronic mail client, the specified folder being one of the one or more folders managed by the electronic mail client; and causing the specified folder not to be visible in the user interface when the visibility condition is satisfied.

15. The computer program product of claim 14, wherein the visibility condition includes at least one range of times within a day and the visibility condition is satisfied only if a current time is within the range of times.

16. The computer program product of claim 14, wherein the visibility condition includes at least one range of days within a week and the visibility condition is satisfied only if a current day is within the range of days.

17. The computer program product of claim 14, wherein the computer readable program codes are further configured to cause the program to:

provide a user interface element; and cause the specified folder to be visible whether or not the visibility condition is satisfied when the user interface element is activated.

18. The computer program product of claim 14, wherein:

each of the one or more folder rules specifies a message characteristic and a folder; and the program code configured to associate the electronic mail message with at least one of the one or more folders managed by the electronic mail client includes program code configured to:

determine whether the electronic mail message matches any of the message characteristics specified in the one or more folder rules; and if the electronic mail message is determined to match one of the message characteristics specified in the one or more folder rules, associate the electronic mail message with the folder specified by the folder rule specifying the matched characteristic.

19. The computer program product of claim 14, wherein the computer readable program codes are further configured to cause the program to:

receive at least one message rule specifying when electronic mail messages matching a message characteristic are not visible in the user interface;

determine whether an electronic mail message matches the message characteristic; and cause the electronic mail message not to be visible in the user interface in accordance with the message rule if the electronic mail message is determined to match the message characteristic.

20. The computer program product of claim 19, wherein the message characteristic is an element selected from the group of an electronic mail address of a sender of the electronic mail message, text included in a subject of the electronic mail message, text included in a body of the electronic mail message, a property of attachments to the electronic mail message, an importance of the electronic mail message, and a range of sizes of the electronic mail message.

* * * * *